Dec. 12, 1967　　　　　　M. C. SICARD　　　　　　3,357,563
APPARATUS FOR TREATING WATER

Filed March 2, 1964　　　　　　　　　　　　　　2 Sheets-Sheet 1

INVENTOR
MARCEL CLARENCE SICARD
BY
ATTORNEY

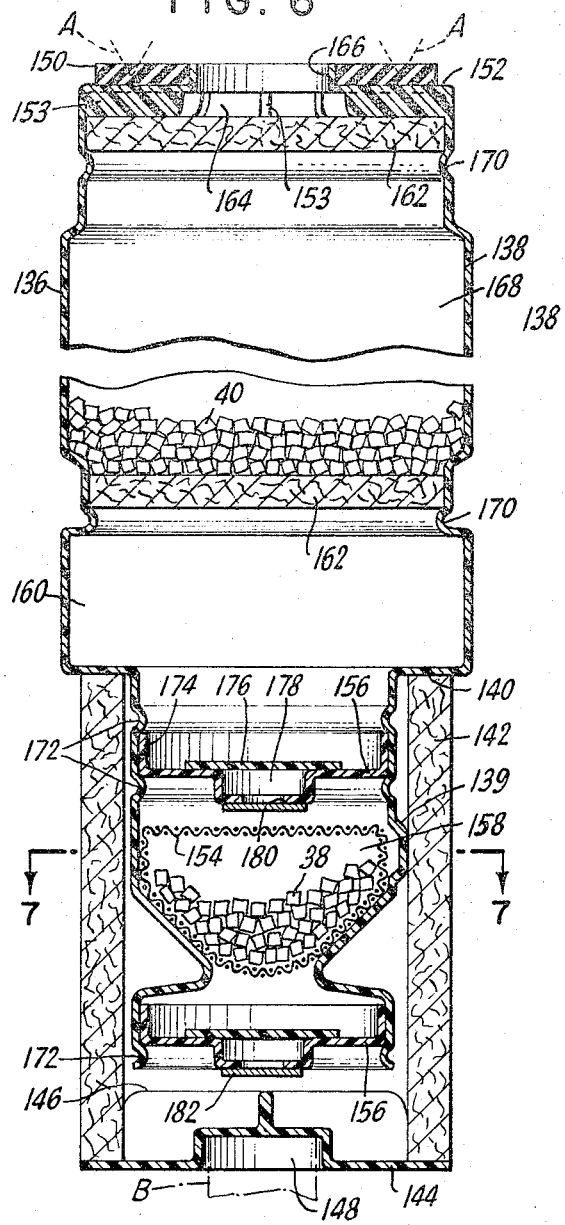
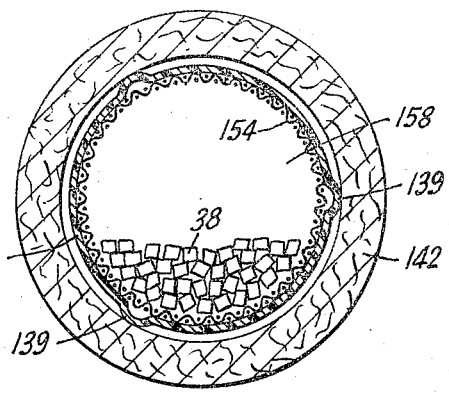
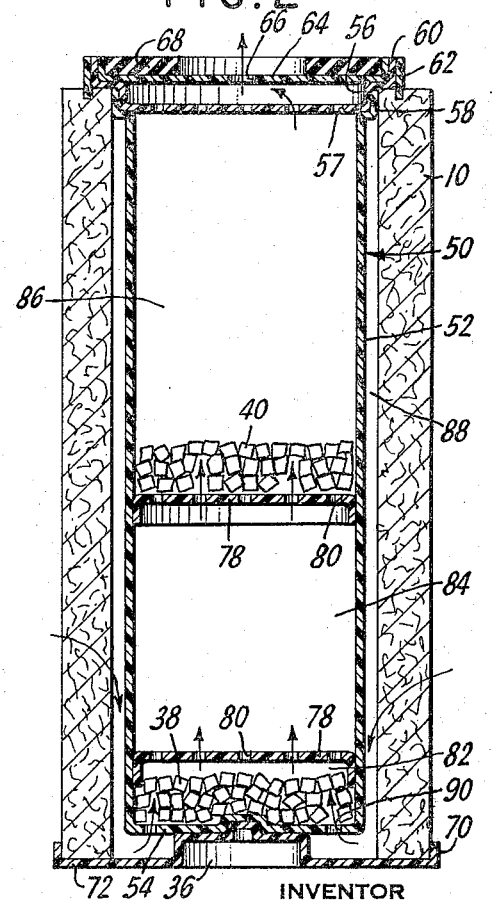
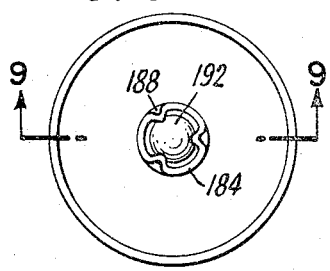
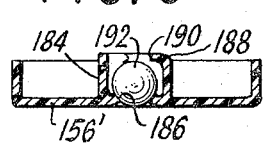

United States Patent Office 3,357,563
Patented Dec. 12, 1967

3,357,563
APPARATUS FOR TREATING WATER
Marcel Clarence Sicard, Cheshire, Conn., assignor to American Machine & Foundry Company, a corporation of New Jersey
Filed Mar. 2, 1964, Ser. No. 348,390
4 Claims. (Cl. 210—209)

This invention is concerned with the treatment of fluids by mechanical and chemical means. One example of such treatment is the filtration and purification of water to render it bacteriologically, chemically and aesthetically desirable for human consumption.

One object of the invention is to provide a chemical container which is also suited to be a structural member in a filtering cartridge unit.

Another object is to provide a filtering and chemical treating unit for the purification of water, which is of simple and rugged construction, suited for use by totally illiterate people and which automatically warns its user when its protective functions are about to become inoperative.

A further object is to provide in one unit a means for chemically purifying water and subsequently neutralizing any excess of the purifying chemical remaining in the water.

Still another object is to provide a simple means for chemically treating water or other fluids, which means may readily be inserted in a domestic water system.

Other objects will become apparent to those versed in the art, on examining the following specification and the appended drawings.

Turning to the drawings, these show embodiments of the invention in the form of a cylindrical throw-away unit suitable for use in a housing such as is disclosed in U.S. Patent 2,966,990.

In the drawings:

FIG. 2 is generally similar to FIG. 1, but shows a construction having separable filtering and chemically purifying means;

FIG. 6 shows a longitudinal section of a preferred construction;

FIG. 7 is a cross-sectional view of the device of FIG. 6 taken on line 7—7;

FIG. 8 shows an alternate construction of a part of the device shown in FIG. 6, and;

FIG. 9 is a cross-sectional view of the structure of FIG. 8, taken on line 9—9.

In the description given below of the different structures, like members are applied to like parts.

Figure 1:
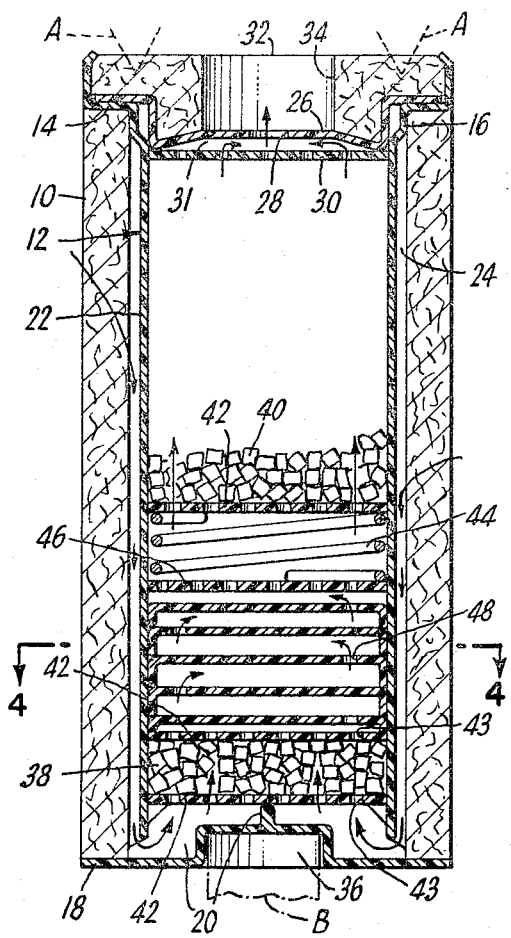
FIG. 1 is a longitudinal section of one embodiment of unitary construction.
Figure 4:
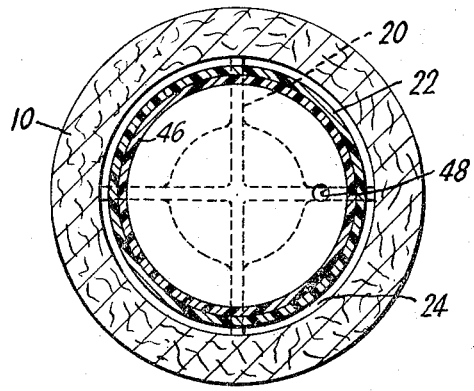
FIG. 4 is a transverse sectional view of the device of FIG. 1 taken along line 4—4.

In the construction shown in FIGS. 1 and 4, a tubular filter member 10, which may be made according to the disclosure of Anderson in U.S. Patent 2,539,768, surrounds a container, generally indicated as 12 and having a tube 22, which is positioned therein by flange 14, stepped diameter 16 and end cap 18 which has a plurality of radially and axially extending ribs 20 engaging the inner surface of member 10 and the end and inner surfaces of tube 22 as shown. The above described organization of parts affords an annular drainage space 24 which communicates with the interior of tube 22 via the spacing between ribs 20.

A flanged cuplike closer 26 is secured to flange 14 and projects within tube 22. It has an opening 28 and it supports a perforate disc 30. A support member 32 having a central bore 34, is preferably made of the same material as the filter member 10. It serves to back up the closer 26 and also as a gasket for engagement with a ring-like sealing surface of the head of the filter housing (not shown) in which the device is used. Such a sealing surface is indicated at A. The end cap 18 has a central depression or cavity 36 suited to engage for both support and relative rotation, a post in the bottom of the filter housing in which the device is used. Such a post is indicated at B. The components, end cap 18, tube 22 and closer 26 of container 12 are preferably made of a thermo-plastic synthetic resin such as, for example, polyethylene, and heat-sealed or otherwise adhered together and also to filter member 10 and support member 32 to form a unitary structure.

Within the tube 22 is housed a quantity of a material 38 and also a quantity of another material 40. The functions of these materials, which are preferably in granular or lump form, will be later described. The material 38 is located between a pair of perforate plates 42 and the material 40 is located between disc 30 and a third plate 42. The three plates 42 are a sliding fit in tube 22. A compression spring 44 and a series of diffusers 46 which are also a sliding fit within tube 22 are located between the inner two plates 42 as shown and, by this arrangement the spring 44 is enabled to maintain a compacting pressure on all of the contents of tube 22. The diffusers 46 may be in the form of shallow cups having a single perforation 48, stacked so that the perforations are located in a staggered arrangement whereby fluid flowing axially through the stack will be forced to take a long and tortuous path and so become thoroughly mixed. FIG. 4 clearly shows a plan view of a diffuser 46 with its cup rim in section.

The flow of fluid through a device as above described would be, as indicated by arrows, through the filter member 10 into drainage space 24 and thence passed the end of tube 22 through plate 42 and over the material 38. The fluid path then proceeeds through second plate 42, the holes 48 in the stack of diffusers 46, within coil spring 44 and through the third plate 42 whence the fluid flows over material 40 from which it emerges through disc 30 into collector chamber 31 and passes through opening 28 and into bore 34 from which it may flow to the filter outlet (not shown). As earlier indicated, a structure of this type is useable for the purification of water. In such service, the filter portion 10, would remove objectionable solids, the material 38 would preferably be a bactericide, iodine in crystalline form for example, and the material 40 would desirably be activated carbon, which would absorb iodine remaining in the water after the bacteria had been destroyed. The function of the space occupied by the diffusers and spring is to afford time for the killing action of the bactericide. The carbon would also serve to absorb, where present, a variety of other objectionable odor and taste causing matter such as chlorine, sulphur compounds and so on.

In practice the amount of carbon would be so proportioned that its absorbing qualities would be completely spent before all the iodine had been used. In this way, the user would be warned by an unpalatable iodine taste or odor, that the life of the device had been exhausted and a replacement was needed. Such warning would be given prior to loss of bacteria killing power and would constitute a "fail safe" arrangement. The opening 28 serves as a flow restrictor and may be proportioned to allow ample killing time in the diffuser chamber.

Where iodine is used as a bactericide it will be desirable to immure it within its chamber until it is put into use, to prevent sublimation or to confine the products thereof. This may be readily accomplished by adhering a thin film of paper over the hole or holes 43 in plates 42. The pressure of the fluid flowing through the device when it is put in service will rupture the paper or, if aptly chosen, the adhesive will dissolve and the paper wash aside, alternatively, a soluble film such as those based on starch, may be used. A similar sealing may also be applied to the outlet 28. No drawing of this feature is needed. Alternatively, the material to be sealed off may be coated with a water-soluble coating. This comment is applicable to all constructions in this disclosure.

The construction shown in FIG. 2 is generally like that of FIG. 1 but is arranged to permit the separation of the filtering member and the container containing the fluid treating material. Such separation may be desirable where, for example, the filter, per se, becomes clogged with dirt before the chemicals are spent. Or, of course, the opposite condition may prevail and the chemicals need replacement long before the filter does.

The container, generally indicated as 50, comprises a deep cup 52 closed at one end by wall 54 and at the other by closer 56 having perforations 57 and which is accommodated within an enlarged diameter portion 58 of cup 52. Closer 56 also has an enlarged diameter portion 60, to the axially extending wall of which is secured a sealing ring 62. A cup 64 having a perforation 66 is carried within the enlarged diameter portion 60 of closer 56 and in turn carriers a gasket 68 adapted and arranged for sealing engagement with the head of a filter (not shown).

The filtering member 10 is proportioned to be located at one end on enlarged diameter portion 58 and at the other end by the axially extending wall 70 of outer closer 72 which has a cavity 36 arranged for reception in a support post (such as is indicated at B in FIG. 1) and which further has a central protrusion 74 proportioned for nesting within a depression 76 in the end wall 54 of cup 52.

A pair of cups 78 having perforations 80 are slidingly supported within cup 52 and divide the space between end wall 54 and closer 56 into three chambers, 82, 84 and 86. Within chamber 82 is a bactericidal material 38, within the chamber 86 is a quantity of a taste and odor removing material. Within the chamber 84 is located a suitable spacing media, this may conveniently be a spring and series of diffuser cups such as are indicated at 44 and 46 in FIG. 1, or may be a quantity of inert material such as sand; the former being preferred as the compacting effect of the spring 44 has the advantage of holding granular material against unwanted movement.

The outer closer 72 may be of any convenient material, metal or plastic, for example, and the filter member may, as in the structure of FIG. 1, be an accreted fibrous tube. While not essential to the successful operation of the device, it is preferred that these parts, 10 and 72, be adhered together for mutual support and to prevent leakage at the joint between them, which would be detrimental to the filter's function. The components of container 50 are most desirably made of a thermo-plastic material and have the joint between cup 52, closer 56 and sealing ring 62 secured by fusion or by cementing. The cup 64 and gasket 68 may be secured in place by similar means.

In use, the filter member 10 with its closer 72 would be slipped over container 50 to the position shown and the whole would be held in place by the normal mounting means afforded in the filter housing (not shown) which would cause sealing ring 62 to have penetrating sealing engagement with member 10.

In use, fluid would flow through member 10 into drainage space 88, through perforations 90 in end wall 54, through chambers 82, 84 and 86 by way of perforations 80, through perforations 75 in closer 56 and thence to the filter housing's outlet via perforation 66 which may be conveniently sized to control the flow rate of the fluid being treated.

Figure 3:
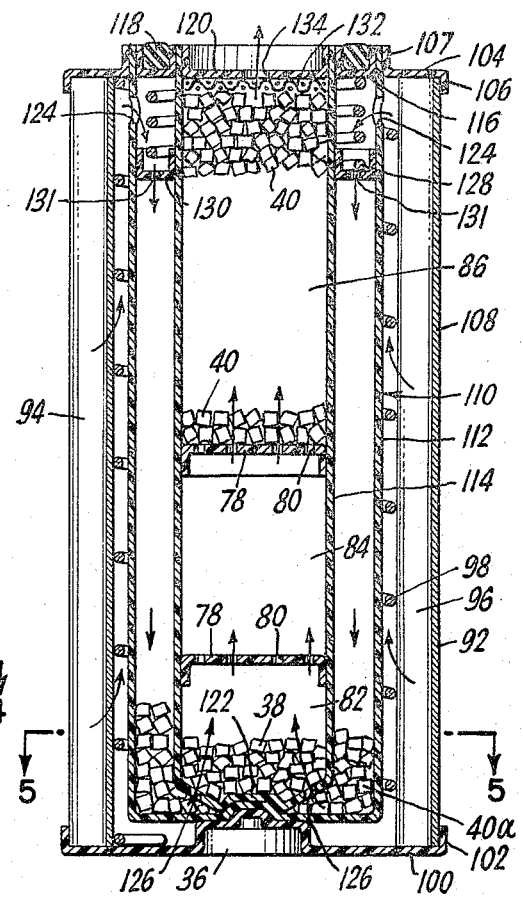
FIG. 3 is again generally similar to FIG. 1 but shows another form of filter and a modification of the chemical portion.

In FIG. 3 is shown another embodiment of the invention which employs a substantially conventional longitudinally pleated cylindrical paper filter element and also a "pre-treating" chemical, the function of which will be later explained.

Figure 5:
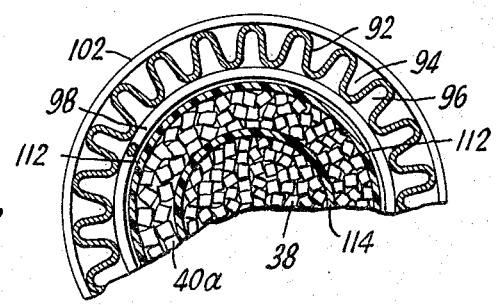
FIG. 5 is a transverse sectional view of the device of FIG. 3, taken along line 5—5.

The filter member 92 is made of paper and longitudinally pleated affording ingress channels 94 and drainage channels 96, all well known to those acquainted with the art and shown in FIG. 5. A helically coiled spring-like wire form 98 may conveniently be inserted within member 92 so as to engage the minor diameter thereof as a support against collapse. A closer cap 100, of any convenient material, is preferably cemented to one end of member 92 and provided with a wall 102 to protect the joint. An annular cap 104 having a protective wall 106 and a container support wall 107 is cemented to the other end of member 92. The above described parts comprise the filter unit, generally located as 108.

A container, generally indicated as 110, is housed within the filter unit 108 and comprises an outer cup 112, a substantially concentric inner cup 114 and a closer ring 116 of channel section which carries a gasket 118 adapted for sealing engagement with a filter head around its outlet port (not shown). The above enumerated components of container 110, together with annular cap 104 and the outlet closure 120 are, as in the embodiments previously described, preferably made of a suitable synthetic thermoplastic resin and adhered together by fusion or cementing at the junctions of their contiguous faces. The closer cap 100 has a large central cavity 36, suited, as in the previous cases, for engagement with a cooperating portion of a filter housing (not shown). In the center of the end walls of cups 112 and 114 and in the center of the wall of cavity 36 is a series of nesting depressions and protuberances which are indicated collectively as 122 and which, by inter-engagement afford mutual support.

The wall of cup 112 has a number of perforations 124 and the end wall of cup 114 has a number of perforations 126. A helical compression spring 128 lies in the annular space between these cups and abuts closer ring 116 and sliding ring 130, tending to separate them. The remainder of the annular space between the cups is occupied by a "pre-treating" chemical 40a which in granular or lump form, is compacted by spring 128. The cavity within cup 114 is divided, as in the case of the structure shown in FIG. 2, into three parts 82, 84 and 86 by sliding cups 78 having a plurality of perforations 80 and again as in the case of FIG. 2 a bactericidal material 38 is housed within chamber 82, a suitable spacing media is housed within chamber 84 and a taste and odor removing media 40 is housed within chamber 86. Also as in the previously described case, a compression spring in chamber 84 may place the chemicals in chambers 82 and 86 under a compacting load. The path of fluid being treated will be through the wall of filter member 92 into drainage channels 96, then axially to perforations 124 and on into the annulus between cups 112 and 114 through holes 131 and thence axially over "pre-treat" material 38a and through the end-wall of cup 114 via perforations 126 into chamber 82, over the bactericidal material 38 therein; through perforations 80, diffuser chamber 84, perforations 80 and into chamber 86 over taste and odor removal material 40 therein, through mesh disc 132 and out through opening 134 in disc 120, which opening may, as in the previous cases, be proportioned to control flow rate.

In the construction here disclosed a quantity of "pre-treating" material 40a is provided, this may well be identical with that in chamber 86 which is used as a taste and odor removing media; activated carbon for example. The function of this "pre-treat" material is to remove taste and odor causing impurities from the water so that the material in chamber 86 has no other duty than that of removing bactericide from the water and its capacity will not be thrown out of balance by extraneous causes.

In the embodiments above described and shown in

FIGS. 1-5 inclusive, the filtering member (10 in FIGS. 1, 2 and 4 and 92 in FIGS. 3 and 5) may be regarded as the basic structural element having the chemical treating component mechanically subordinate thereto and preferably proportioned to fit within and be carried thereby. Such an arrangement is well-suited to those situations where the fluid to be treated is so burdened with particulate impurities as to make the filtering member of primary interest.

There are, however, occasions where the fluid to be treated is relatively free from particulate matter, but is heavily charged with obnoxious micro-organisms, and may also be malodorous because of entrained gases. For example, drinking water obtained from a surface well in sandy soil may be sparkling clear and yet be dangerously contaminated by bacteria etc., originating in the organic wastes common to animal husbandry. In such cases, an arrangement wherein the chemical treating means is the basic structural element and the filtering device, per se, is mechanically subordinate thereto, is eminently suitable, and may be preferred.

FIG. 6 shows such a construction. It will be described in relation to the earlier mentioned treatment of drinking water, although the arrangement is not of necessity limited to that use. The fluid flows sequentially through, a filtering member, a first chamber containing a bactericide (iodine in a convenient form, in this case), a second chamber affording time for the killing action of the iodine and then through a third chamber containing activated carbon wherein taste causing elements, including unused iodine, will be retained. As in the case of the earlier described constructions, the quantity of iodine and carbon are, most desirably, so proportioned as to insure the latter being spent before the former whereby a warning taste is imparted to the water before the end of the bactericidal life of the device.

Turning now to the details shown in FIG. 6, which is a longitudinal section taken on the axis of a figure of revolution. The chemical treating means, generally indicated as 136 comprises an envelope 138 having a shoulder 140 to which is secured, by any convenient means, such as cementing, heating sealing, etc., a hollow cylindrical filter member 142 surrounding a portion of the envelope 138 and centered thereon by ribs 139. A closure 144 is secured to the open end of the member 142 and it has a plurality of ribs 146 which serve both to locate it in relation to member 142 and to strengthen it; it also has a central cavity or depression 148 adapted, as explained in the earlier described constructions, for support and relative rotation on a post, indicated at B, in the bottom of a filter housing (not shown) in which the device is used. A resilient gasket, 150, is mounted on closure disc 152 and arranged and adapted for engagement with a projecting annular sealing surface on the head of the filter housing (not shown); such a sealing surface is indicated at A.

The bactericide 38 is preferably enveloped within a foraminous screen 154 which may be made of a woven plastic material and is located between a pair of transverse wall members 156 which define the chamber 158. The second or "killing time" chamber 160 lies between one of the members 156 and the foraminous disc 162 which is preferably made of an accreted fibrous material such as that used for the filter member 142. A second foraminous disc 162 is secured adjacent the closure disc 152 and is held spaced therefrom by the latter's strengthening ribs 153 which also serve to afford drainage space 164 connecting with the central outlet opening 166. The activated carbon 40 is held within the chamber 168 which is defined by the discs 162.

The envelope 138 has relatively thin flexible walls and may most conveniently be made of a synthetic material such as polyethylene by the blow moulding process. It incorporates a series of inwardly extending beads as shown at 170 and 172 wherewith the transverse wall members 156 and the foraminous discs 162 may be retained after being pressed into place. The members 156 may also be made of a material such as polyethylene and be provided with an axially extending lip 174 to afford a good bearing on the inner surface of the envelope 138; they also comprise a flexible disc-shaped flap valve 176 secured in place, to wall 156, at some portion of its periphery and seating on the lip of the central depression 178 which is pierced, as at 180 to permit the flow of fluid. The valves 176 are arranged to close when no fluid is flowing and thereby prevent any undesired diffusion of dissolved bactericide, either toward the activated carbon 40 or in the reverse direction. Each piercing 180 is initially sealed with a disc 182 of any suitable soluble non-permeable material, whereby the chamber 158 is tightly sealed prior to the passage of fluid therethrough. An alternate to the use of a soluble seal is the employment of a rupturable material such as thin paper or a thin synthetic plastic, in the latter case it may be an integral portion of the wall member 156.

Where, as is preferable, the device is oriented in use with its axis vertical and the closure 144 at the bottom, the construction of the transverse wall members 156 may be modified as shown in FIGS. 8 and 9. Here the member 156 is functionally a duplicate of the member 156 of FIG. 6, but at the center it has a combined valve guide and retainer 184 embodying an annular seat 186 and a plurality of axially extending ribs 188 with stop portions 190. A sphere 192, of glass or other desired material, rests on seat 186 and serves as a valve in the stead of valve 176; it may conveniently be secured to its seat, by a soluble adhesive to insure sealing of the cavity 158 prior to the device being put into use.

While the device shown in FIG. 6 and disclosed above has been discussed as a unitary structure, it is obvious that omission of the operation of securing the filter member 142 to the shoulder 140 of envelope 138 will have no effect on the utility of the device as a whole, while making it possible to replace either the filter or the chemical treating device as desired. Such a change does not depart from the spirit of the present invention.

I claim:

1. A unitary cartridge device for the treatment of water in a pressure vessel having inlet and outlet ports for the flow of said fluid therethrough comprising, a non-permeable container having substantially opposed inlet and outlet openings adapted to communicate with the corresponding ports in said vessel, said container being divided into at least two serially communicating chambers one of said chambers being supplied with a quantity of a soluble bactericidal treatment agent for purifying said water by infusion therewith, the other of said chambers being supplied with a quantity of a neutralizing agent for removing said bactericidal agent from said infused water, the quantities of said bactericide and neutralizing agent being so proportioned that the available life of one is exhausted before the other so that the remaining agent affords a physio-sensory indication that said cartridge has reached the end of its normal useful life.

2. A unitary cartridge device for the treatment of water, comprising a non-permeable container having inlet and outlet openings for substantially axial flow, said container having serially arranged and supported therein from said inlet to said outlet openings a body of filtering media, a quantity of iodine bactericidal material, a foraminous separator of sufficient flow depth to afford said iodine time to effect treatment of said water, and a quantity of carbon material located between said foraminous separator and said outlet port, whereby said water may be serially removed of its particulate matter and bacterial organisms while passing through said device, said iodine and said carbon being so proportioned that the effective component of said carbon material is exhausted prior to the effective component of said iodine whereby the remaining iodine affords a physio-sensory warning that said device is at the end of its normal life.

3. A unitary cartridge device for the treatment of water comprising, a tubular permeable filter element adapted for radial flow therethrough, a non-permeable container having inlet and outlet openings for substantially axial flow, said container being arranged and supported at least in part within said filter element so that said water flows serially therethrough, said container having sequentially arranged and supported therein from said inlet to said outlet openings a body of filtering media, a quantity of iodine bactericidal material and foraminous separator of sufficient flow depth to afford said iodine time to effect treatment of said water, and a quantity of an activated carbon material located between said foraminous separator and said outlet port, whereby said water may be serially removed of its particulate matter and bacterial organisms while passing through said device, said iodine and said carbon being so proportioned that the effective component of said carbon is exhausted prior to the effective component of said iodine whereby the remaining iodine affords a physio-sensory warning that said device is at the end of its normal life.

4. A unitary cartridge device for the treatment of water in a pressure vessel having inlet and outlet ports for the flow of said water therethrough comprising, a non-permeable container having substantially opposed inlet and outlet openings adapted to communicate with the corresponding ports in said vessel, said container having a first chamber communicating with said inlet port, a quantity of soluble bactericidal treatment agent for purifying said water by infusion therewith, located in said first chamber, a second chamber communicating with said outlet port, a quantity of neutralizing agent for removing said bactericidal agent from said infused water, located in said second chamber, a third chamber situated between said first and second chambers and communicating with each, valve means associated with said third chamber and each of said first and second chambers to permit the infused fluid a sufficient dwell time in said third chamber, said bactericide and said neutralizing agent being so proportioned that the available life of said neutralizing agent is exhausted before the bactericide so that the bactericide affords a physio-sensory indication that said cartridge has reached the end of its normal useful life.

References Cited
UNITED STATES PATENTS

| | | | |
|---|---|---|---|
| 1,694,804 | 12/1928 | Turner | 210—136 |
| 2,103,434 | 12/1937 | Pennebaker | 210—284 X |
| 2,238,896 | 4/1941 | Gibbons | 210—62 |
| 2,595,290 | 5/1952 | Quinn | 210—39 X |

FOREIGN PATENTS 9,062  6/1956  Japan.

SAMIH N. ZAHARNA, *Primary Examiner.*
REUBEN FRIEDMAN, *Examiner.*